June 4, 1935. M. E. SEEBER 2,003,520
ORCHARD OR FIELD HEATING AND IRRIGATING APPARATUS
Filed Sept. 9, 1931
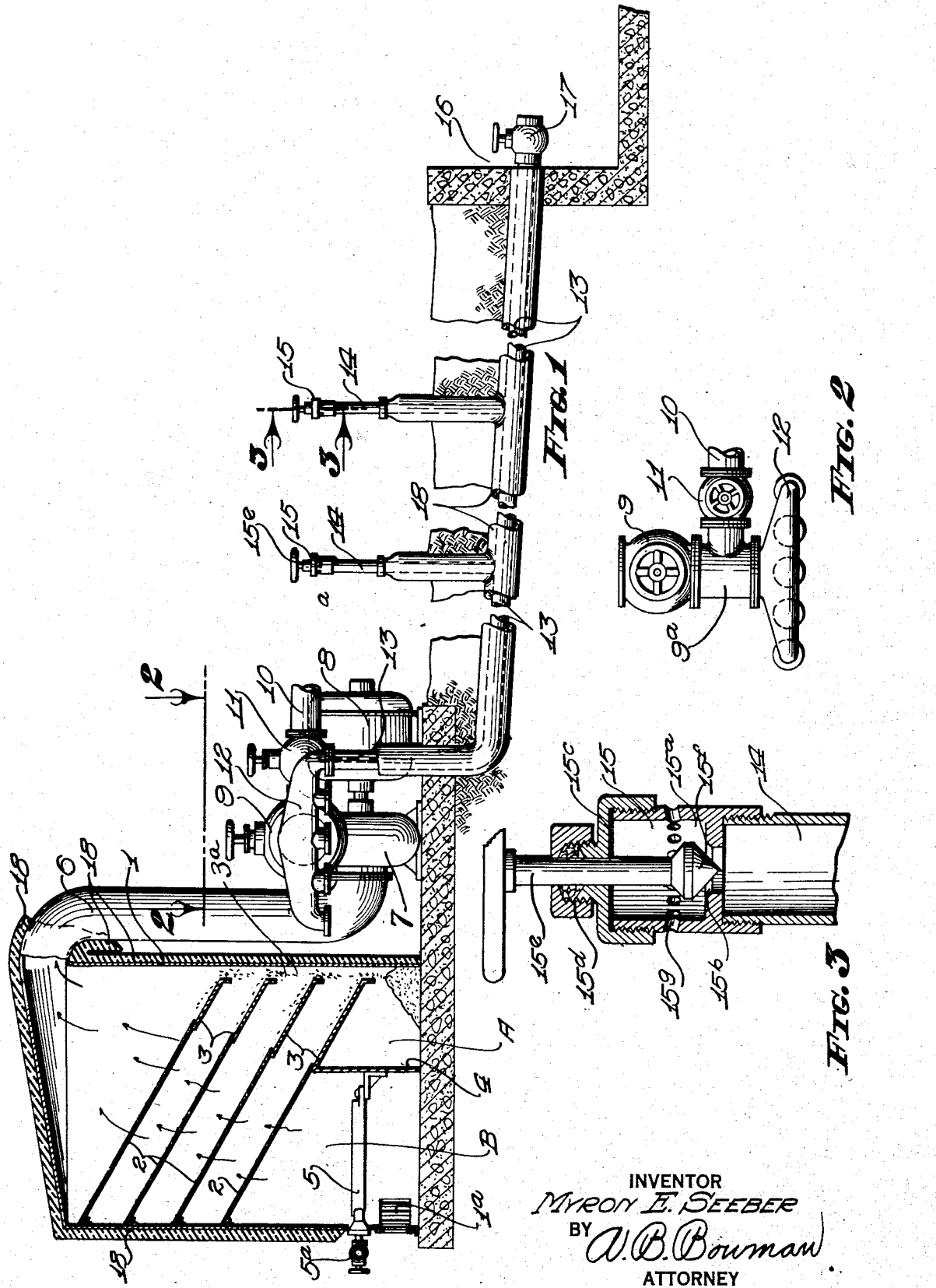
INVENTOR
MYRON E. SEEBER
BY W. B. Bowman
ATTORNEY Patented June 4, 1935

2,003,520

UNITED STATES PATENT OFFICE 2,003,520

ORCHARD OR FIELD HEATING AND IRRIGATING APPARATUS

Myron E. Seeber, San Diego, Calif.

Application September 9, 1931, Serial No. 561,835

4 Claims. (Cl. 126—59.5)

My invention relates to orchard or field heating and irrigating apparatus, and the objects of my invention are:

First, to provide an apparatus of this class in which the same piping system may be used to supply water for irrigation, or to supply heated gases for the purpose of preventing injury to the trees caused by frost.

Second, to provide an apparatus of this class which eliminates the need of smudge pots or other cumbersome and dangerous means for preventing the formation of frost.

Third, to provide an apparatus of this class which readily lends itself to automatic control, thereby reducing to a minimum the period during which the furnace need be in operation.

Fourth, to provide an apparatus of this class which discharges the heated gases laterally as well as upwardly so as to form a heated blanket of air above the ground capable of protecting truck gardens, as well as orchards; and Fifth, to provide an apparatus of this class which is positive and efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a fragmentary diagrammatical view of my apparatus; Fig. 2 is a fragmentary plan view through 2—2 of Fig. 1; and Fig. 3 is an enlarged sectional view of one of the distributing valves.

Similar characters of reference refer to similar parts and portions throughout the several views of the drawing.

Furnace 1, soot collecting screens 2, soot diverting plates 3, partition 4, heating means 5, main gas conduit 6, blower 7, motor 8, main gas valve 9, main water line 10, main water valve 11, distributor head 12, distributing pipes 13, sprinkler pipes 14, sprinklers 15, sump 16, drain valve 17, and insulation 18, constitute the principal parts and portions of my novel orchard or field heating and irrigating apparatus.

The furnace 1 forms a completely enclosed chamber including vertical walls from which are supported a plurality of parallel disposed sloping screens 2, arranged one above the others. The screens do not extend the full diameter of the furnace but are connected at their lower ends to plates 3. The plates 3 terminate a short distance from the adjacent wall of the furnace forming passages 3a. The screens retard the flow of gases through the furnace, so that the soot collects thereon and tends to pass downwardly thereon and on to the plates 3. The plates 3 are arranged at such an angle that the soot slides therefrom and falls down the passages 3a to the bottom of the furnace. This portion of the furnace forms a soot collecting chamber A, which is separated from the fire box, designated B, by a partition 4, which extends upwardly to the first soot diverting plate 3.

The firing chamber B is provided with a suitable heating means 5, which is connected to a suitable source of fuel supply 5a. Below the heating means 5, there is provided a suitable air inlet 1a.

The upper end of the furnace 1 is connected to a main gas conduit 6, which is joined to the intake side of a blower 7. The blower 7 is driven by a suitable motor 8. The outlet end of the blower 7 is equipped with a main gas valve 9. Continuing from the main gas valve 9 is a short pipe 9a, to which is connected the main water line 10, a main water valve 11 being provided in the line 10, adjacent the stub pipe 9a. The stub pipe 9a connects to a distributor head 12, or other suitable means for supplying gas or water to a distributing system.

Each of the several outlets of the distributor head 12 is connected to a distributing pipe 13. Each distrbiuting pipe 13 is positioned underneath the ground far enough to clear any of the various tools used in the cultivation of the orchard or truck garden with which my apparatus is associated. At various suitable locations each distributing pipe 13 is provided with upwardly extending, protruding sprinkler pipes 14.

The upper end of each sprinkler pipe 14 is equipped with a sprinkler 15. The sprinkler 15 includes a body member 15a, which is screwed upon the upper end of the sprinkler pipe 14. The lower portion of the body member 15a is provided with a valve seat 15b. The upper end of the body member 15a is provided with a cap 15c, which is provided with a packing gland 15d. The packing gland 15d supports a valve stem 15e, the upper end of which is equipped with a handle, while the lower end is provided with a valve member 15f adapted to coact with the valve seat 15b. These parts are made of suitable metal capable of withstanding the action of water or of heated gases. Above the valve seat 15b, the body member 15a is provided with a plurality of substantially laterally extending openings or ports 15g.

Each distributing pipe 13 is so arranged as to have a point thereof lower than the remaining portion of the pipe so that said pipe and the sprinkler pipes connected therewith may be completely drained. At this portion of each distribution pipe 13, there is provided a sump 16 and a suitable drain valve 17.

It is preferred to cover the furnace 1, the main gas conduit 6, the distributing pipes 13, the sprinkling pipes 14, and all other portions of the apparatus from which heat may be dissipated with a blanket of insulation 18. The insulation is shown broken away or removed in portions to facilitate the illustration.

Operation of my orchard or field heating and irrigating apparatus is as follows:

The furnace is preferably located in a central position with respect to the field or orchard which it is desired to heat in order to reduce the length of the various distributing pipes to a minimum. During the season for irrigation, the valve 9 is closed and the valve 11 is open so that water flows through the various distributing pipes 13 and out the various sprinklers 15, the drain valve 17 being closed during this period.

When the orchard or field is in danger of frost, the valve 17 is opened so as to drain the distributing pipes 13 associated therewith, whereupon the valve 17 is again closed. The valve 11 of course is closed and the valve 9 is opened. The furnace 1 and blower are then set in operation whereupon the heated gases, from which the larger quantity of soot has been removed by means of the screens 2, pass out the main air conduit 6 through the blower 7 and into the various distributing pipes 13. From the distributing pipes, the heated gases pass out of the various sprinklers 15.

It is obvious of course that the furnace and blower may be thermostatically controlled so that they commence their operation automatically whenever the temperature drops to a predetermined point.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an orchard or field heating apparatus, the combination with a fluid distributing system, of a heater including a closed casing with an outlet opening at its upper side connecting with said distributing system, a plurality of superposed angularly positioned soot collecting screens near one side of said casing with their lower edges spaced from the side wall of said casing, and a fuel burner positioned under the lowermost screen.

2. In an orchard or field heating apparatus, the combination with a fluid distributing system, of a heater including a casing with an outlet opening at its upper side connecting with said distributing system, a plurality of superposed angularly positioned soot collecting screens near one side of said casing, a fuel burner positioned under the lowermost screen, and a soot diverting plate with its lower edge spaced from the side wall of said casing extending from the lower edge of each of said screens for diverting the soot downwardly out of the path of the heat circulation.

3. In an orchard or field heating apparatus, the combination with a distributing system, of a heater including a casing with an outlet opening at its upper side connecting with said distributing system, a plurality of superposed angularly positioned screens positioned with their higher edges at the opposite side from the outlet of said casing, a partition in said casing below the lower edges of said screens dividing the lower side of said casing below said screens into a fuel burner compartment and a soot collecting compartment, a fuel burner positioned in said fuel burner compartment positioned under the lowermost of said screens.

4. In an orchard or field heating apparatus, the combination with a distributing system, of a heater including a casing with an outlet opening at its upper side connecting with said distributing system, a plurality of superposed angularly positioned screens positioned with their higher edges at the opposite side from the outlet of said casing, a partition in said casing below the lower edges of said screens dividing the lower side of said casing below said screens into a fuel burner compartment and a soot collecting compartment, a fuel burner positioned in said fuel burner compartment positioned under the lowermost of said screens, a plate member positioned under the lower edges of each of said screens and extending downwardly parallel therewith and having their lower edges spaced from the side wall of said casing whereby soot from said screens may pass downwardly into said soot collecting compartment.

MYRON E. SEEBER.